United States Patent [19]

Müller et al.

[11] 3,855,554

[45] Dec. 17, 1974

[54] OSCILLATOR CIRCUIT FOR TESTING INDUCTORS

[75] Inventors: Gerhard Müller; Rolf Bondiek, both of Backnang, Germany

[73] Assignee: Licentia Patent-Verwaltungs-G.m.b.H., Frankfurt am Main, Germany

[22] Filed: Oct. 30, 1973

[21] Appl. No.: 411,173

[30] Foreign Application Priority Data

Oct. 31, 1972 Germany........................... 2253296

[52] U.S. Cl................... 331/167, 324/57 Q, 324/59

[51] Int. Cl. ............................................ H03b 5/08

[58] Field of Search ................ 331/117 R, 167–171; 324/57 Q, 59

[56] References Cited

UNITED STATES PATENTS 3,571,703 3/1971 Russell................................ 324/59

FOREIGN PATENTS OR APPLICATIONS 2,059,630 6/1972 Germany ........................... 331/167

*Primary Examiner*—Herman Karl Saalbach
*Assistant Examiner*—Siegfried H. Grimm
*Attorney, Agent, or Firm*—Spencer & Kaye

[57] ABSTRACT

A generator arrangement for producing electrical oscillations for testing an inductor and measuring its quality factor. The generator arrangement has a pair of terminals across which a test inductor is connected. A capacitor is connected to one of the terminals, so that the test inductor and the capacitor are in series. A feedback loop is connected between the terminals and includes connected in sequence: a full wave rectifier rectifying the oscillating voltage across the capacitor; a threshold value circuit producing rectangular pulses; a frequency divider producing two output signals, with respectively opposite phases and one-half the frequency of the output of the threshold value circuit; an AND circuit having its first input connected to one of the outputs of the frequency divider and its second input connected to the output of the threshold value circuit; a negated AND circuit having its first input connected to the other output of the frequency divider and its second input connected to the output of the threshold value circuit; and a summing circuit connected to the two AND circuits for summing their output signals.

2 Claims, 9 Drawing Figures

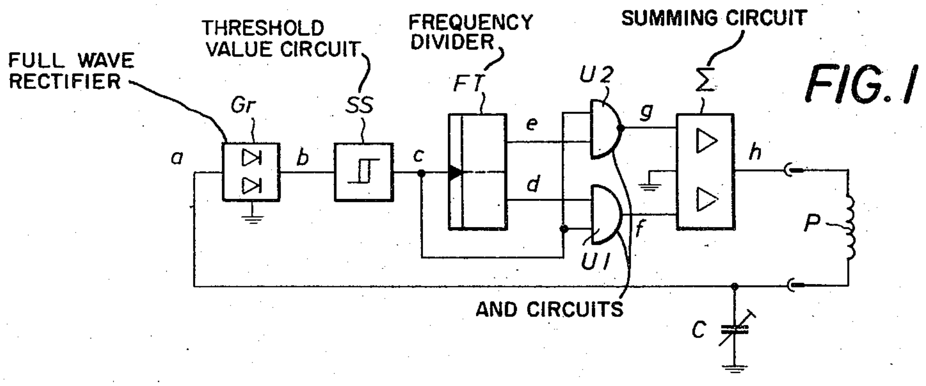
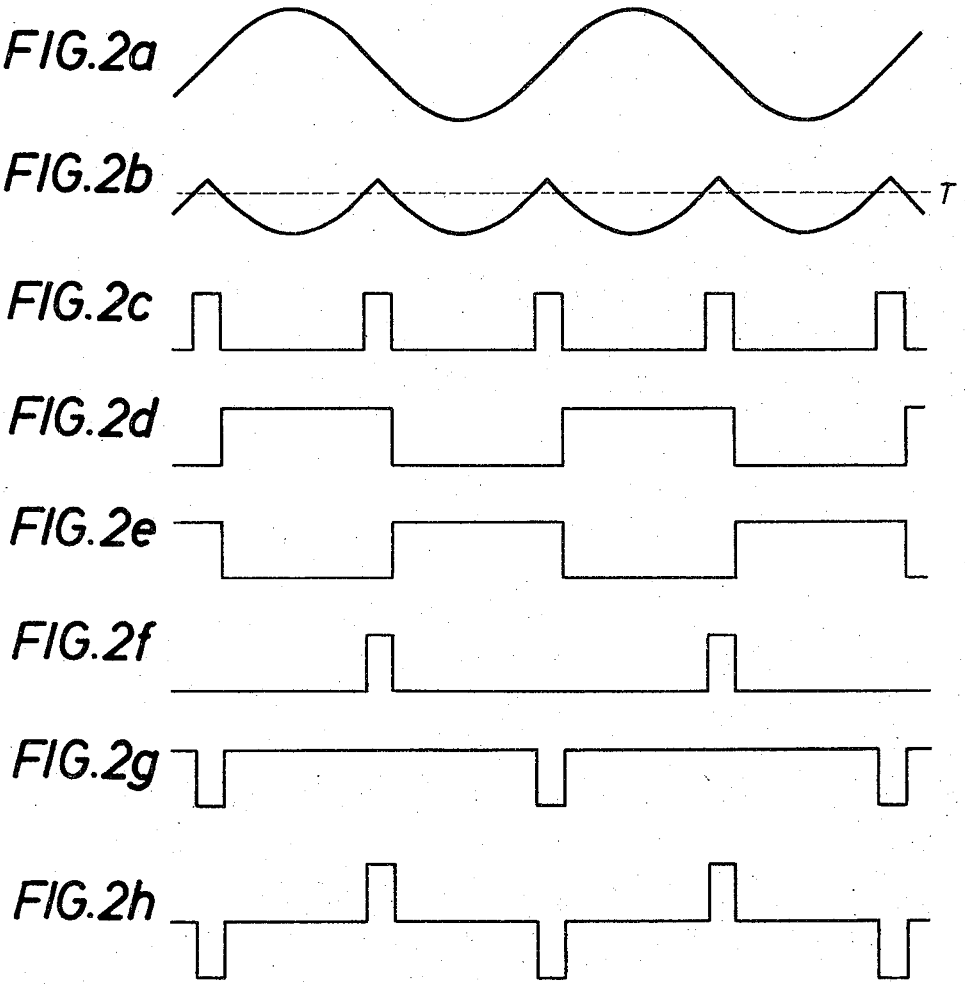
FIG. 2a, FIG. 2b, FIG. 2c, FIG. 2d, FIG. 2e, FIG. 2f, FIG. 2g, FIG. 2h

OSCILLATOR CIRCUIT FOR TESTING INDUCTORS

BACKGROUND OF THE INVENTION

The present invention relates to a generator for producing electrical oscillations for testing of inductances and measuring their quality factors and their equivalent resistances.

In our German Pat. application, published as Laid-open application (Offenlegungsschrift) No. 2,059,630, a circuit arrangement is described for measuring the quality i.e., the Q-factor, of inductance coils in which an electrical voltage oscillation is fed to the series connection of the inductor to be tested with a capacitor. This series connection determines the frequency of the oscillation within the circuit. The electrical voltage oscillation is produced by a self-excited generator and the feedback voltage for this purpose is taken from across the capacitor. Such an arrangement has the advantage that the test inductor itself remains completely unstressed by the actual test devices, but it has the drawback that the voltage obtained from across the capacitor is shifted in phase by about 90° with respect to the voltage fed to the series circuit. Due to this shift in the voltage, it becomes necessary to utilize a special phase shifter in the feedback branch in order to assure self-excitation of the generator. In the known circuit arrangement, it is possible to vary the capacitance of the capacitor in order to be able to test the inductance coil at different frequencies. Since the phase shifter is frequency dependent, however, the phase shifter in this circuit arrangement must also be variable, especially if the arrangement is to be used over a wide frequency range. Automatic test systems employing such a circuit arrangement, therefore, are expensive.

SUMMARY OF THE INVENTION

An object of the present invention is to provide a generator arrangement for testing an inductor which avoids the above-mentioned drawbacks.

The generator arrangement according to the present invention avoid these drawbacks in the production of the electrical voltage oscillations for testing inductors and measuring their quality factor. The inductor to be tested is connected between a pair of test terminals and a capacitor is connected to one of these terminals, so as to be in series with the test inductor. This series connection of the test inductor and the capacitor determines the frequency of the generated electrical oscillations. The feedback voltage which serves to maintain the oscillation of the generator is obtained from across the capacitor and is returned to the other terminal connected to the test inductor via a feedback loop. This feedback loop, according to the present invention, includes, connected in sequence: a full wave rectifier which rectifies the oscillating voltage appearing across the capacitor; a threshold value circuit which produces rectangular pulses in response to the peaks of the output signals provided by the rectifier; a frequency divider which cuts the frequency of the rectangular pulses in half and provides two output signals with respectively opposite phases; an AND circuit having its first input connected with the first output of the frequency divider and its second input connection with the output of the threshold value circuit; a negating AND circuit which provides an inverted output, having its first input connected with the second output of the frequency divider and its second input connected with the output of the threshold value circuit; and a summing circuit for summing the output signals of the AND circuits.

BRIEF DESCRIPTION OF THE DRAWINGS

FIG. 1 is a block circuit diagram of the generator arrangement according to the present invention.

FIGS. 2*a* to 2*h* illustrate the voltage waveforms at various points in the circuit of FIG. 1.

DESCRIPTION OF THE PREFERRED EMBODIMENTS

As shown in FIG. 1, a test inductance coil and a capacitor C are connected at a first terminal so that they are in series between point *h* and ground. This circuit is provided with a feedback loop which takes the voltage across the capacitor and feeds a resulting signal back to the other terminal of the test inductor P. This feedback loop is described below.

A full wave rectifier Gr is connected in parallel with the capacitor C. In order not to place any stress on the capacitor C, the input of the rectifier must present a high resistance. Alternatively, it is possible to insert an amplifier with a high-omic input between the capacitor and the rectifier. This amplifier however, is not important for appreciating the present invention, and it, therefore, is neither illustrated in FIG. 1 nor discussed herein.

A threshold value circuit SS following the rectifier G*r* has a response threshold such that it responds only to the peaks of the output voltage furnished by the rectifier G*r*. The output signals from the threshold value circuit SS are connected firstly with the input of a 2:1 frequency divider FT, which is formed by a bistable flip-flop and produces outputs inverse to one another, and secondly with the second inputs of two AND circuits U1 and U2. The first output of the frequency divider is connected with the first input of the AND circuit U1 and the second output with the first input of the AND circuit U2.

The output of the two AND circuits U1 and U2 are connected to the inputs of the summing circuit Σ

Circuit Σ is preferably a push-pull amplifier and as such provides the amplifying portion of the generator.

The described generator is able to maintain the oscillations, but is is not self-exciting, e.g., by noise as it is normally the case for a feedback oscillator. Self-excitation is inhibited by the thresholds of both the threshold value circuit SS as well as of the rectifier G*r*.

If a test inductor P is removed for purposes of replacement the feedback loop is interrupted and the generator stops working. Another test inductor P being inserted the generator will require a start signal, e.g., a pulse, anywhere injected in the feedback loop. In a preferred embodiment the start signal is a wobbling frequency injected at the output of the summing circuit Σ. The wobble generator may be started automatically by a primary start signal delivered by an arrangement supervising the feedback loop if there is no signal in it.

The method used to measure the Q-factor is well known and described, e.g., in the Radio Engineers' Handbook by F.E. Terman, Mc Graw-Hill, New York 1943, page 916, as of line 5, "Q Meter"in connection with FIG. 21.

Referring to FIG. 1 the voltages $U_a$ at point a versus ground, equal to the voltage across the capacitor C and $U_h$ at point *h* versus ground, equal to the voltage across the series combination of the test inductor P and the capacitor C and also equal to the output voltage of the generator are measured and compared. The ratio $U_a$ to $U_h$ nearly equals the Q-factor of the inductor P, provided that the capacitor C implies very low losses, which is normally the case.

A more detailed example for a suited measuring arrangement is given in the last paragraph of the description 2.059.630. the mentioned German Laid-Open application No. 2,059,630.

In order to explain the operation of the generator, the waveforms of FIGS. 2(*a–h*) are provided. The small letters in FIG. 1 identify the points at which the voltage curves in FIGS. 2(*a–h*) bearing the same letter identification occur.

FIG. 2*a* shows the oscillating voltage across the capacitor C which is 90° ahead in phase as compared to the output voltage of the summing circuit Σ which is applied to the series-connection of test inductor P and the capacitor C.

In order to excite the generator, it must be triggered with signals of the appropriate polarity at approximately the times where the curve in FIG. 2*a* passes through 0. Such signals are formed in the generator arrangement according to the present invention in the feedback loop. The oscillations of the curve shown in FIG. 2*a* are rectified in the full wave rectifier G*r*, which produces the waveform shown in FIG. 2*b* with peaks at the times when the curve of FIG. 2*a* passes through 0. A dashed straight line through the waveform in FIG. 2*b* identifies the response threshold T of the threshold value circuit SS which is connected in series with the rectifier. The output signals of the threshold value circuit constitute a sequence of rectangular pulses as shown in FIG. 2*c*. The repetition frequency of these pulses is twice as much as the frequency of the oscillations of the voltage across the capacitor C, as shown in FIG. 2*a*. In the illustrated embodiment, the series connected frequency divider FT switches to another state with every trailing edge of the rectangular pulses and furnishes at its outputs two pulse sequences which are shifted in phase with respect to one another by 180° as shown in FIGS. 2*d* and 2*e*, respectively. The output pulse sequences from the frequency divider FT have a repetition frequency which is one-half the repetition frequency of the output signals from the threshold value circuit SS and thus again the same as the frequency of the voltage oscillations across the capacitor C, as shown in FIG. 2*a*. Each of the output signals of the frequency divider enables one of the two AND circuits U1 or U2, respectively, to switch through. If the output signal of the threshold value circuits reaches the two AND circuits, only the enabled AND circuit furnishes an output sign, thus at one time the AND circuit U1 furnishes a signal as shown in FIG. 2*f*, and at another time the AND circuit U2 furnishes an inverted signal as shown in FIG. 2*g*. Both of the output signals from the AND circuits are summed in circuit Σ, so as to produce the signal shown in FIG. 2*h*, which signal has the necessary frequency and phase position to excite the amplifying portion of the generator.

It will be understood that the above description of the present invention is susceptible to various modifications, changes and adaptations, and the same are intended to be comprehended within the meaning and range of equivalents of the appended claims.

We claim:

1. In a generator arrangement for producing electrical oscillations for testing an inductor and measuring its quality factor, the arrangement including a pair of terminals for connections to such a test inductor, a capacitor connected to one such terminal to be in series with the test inductor, with this series connection of the test inductor and the capacitor determining the frequency of the electrical oscillations, and feedback means having its input connected to such one terminal and its output connected to the other such terminals, the improvement wherein the feedback means comprises: full wave rectifier means connected to said one terminal for rectifying the oscillating voltage appearing across said capacitor; threshold value means connected to the output of said rectifier means for producing rectangular pulses in response to the peaks of the output signal emitted by said rectifier means; frequency divider means connected to the output of said threshold value means for dividing the frequencies of the rectangular pulses in half and producing first and second output signals having opposite phases with respect to each other; an AND circuit having its first input connected to said frequency divider means to receive the first output signal and its second input connected to the output of said threshold value means; a negated AND circuit having its first input connected to said frequency divider means to receive the second output signal and its second input connected to the output of said threshold value means; and summing means connected to the outputs of said AND circuit and said negated AND circuit for summing the output signals of said circuits, said summing means having its output connected to said other terminal.

2. An arrangement as defined in claim 1 wherein said summing means is a push-pull amplifier.

* * * * *